United States Patent
Fripp et al.

(10) Patent No.: US 11,283,297 B2
(45) Date of Patent: Mar. 22, 2022

(54) ELECTRICAL ISOLATION IN TRANSFERRING POWER AND DATA SIGNALS BETWEEN COMPLETION SYSTEMS IN A DOWNHOLE ENVIRONMENT

(71) Applicant: Halliburton Energy Services, Inc., Houston, TX (US)

(72) Inventors: Michael Linley Fripp, Carrollton, TX (US); Thomas Jules Frosell, Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 363 days.

(21) Appl. No.: 16/495,767

(22) PCT Filed: Dec. 20, 2018

(86) PCT No.: PCT/US2018/066762
§ 371 (c)(1),
(2) Date: Sep. 19, 2019

(87) PCT Pub. No.: WO2020/131065
PCT Pub. Date: Jun. 25, 2020

(65) Prior Publication Data
US 2021/0111589 A1    Apr. 15, 2021

(51) Int. Cl.
*H02J 50/12* (2016.01)
*H02J 50/80* (2016.01)
(Continued)

(52) U.S. Cl.
CPC .......... *H02J 50/12* (2016.02); *E21B 17/0285* (2020.05); *H02J 50/80* (2016.02); *E21B 43/08* (2013.01); *H04B 3/02* (2013.01)

(58) Field of Classification Search
CPC ....... H02J 50/12; H02J 50/80; E21B 17/0285; E20B 43/08; H04B 3/02
(Continued)

(56) References Cited

U.S. PATENT DOCUMENTS

| 4,866,607 A | 9/1989 | Anderson et al. |
| 7,735,555 B2 | 6/2010 | Patel et al. |

(Continued)

FOREIGN PATENT DOCUMENTS

| WO | 2012078307 A2 | 6/2012 |
| WO | 2016175827 A1 | 11/2016 |
| WO | 2017003490 A1 | 1/2017 |

OTHER PUBLICATIONS

Kline, "Capacitive Power Transfer", Thesis, UC Berkeley, Technical Report No. UCB/EECS-2010-155, Dec. 15, 2010, 37 pages.
(Continued)

*Primary Examiner* — Alfonso Perez Borroto
(74) *Attorney, Agent, or Firm* — DeLizio Peacock (57) ABSTRACT

A first completion system with electrical isolation, electronics, and a first side of a coupler is installed in a borehole drilled in a geological formation. A second completion system is installed in the borehole after installation of the first completion system. The second completion system has a second side of the coupler aligned with the first side of the coupler and an umbilical which carries power from a surface of the geological formation to the second side of the coupler. Power is sent from the second side of the coupler to the first side of the coupler, from the first side of the coupler to a first side of the electrical isolation, and from the first side of the electrical isolation to a second side of the electrical isolation via an isolation barrier. The power at the second side of the electrical isolation is provided to the electronics.

20 Claims, 7 Drawing Sheets

(51) Int. Cl.
   *E21B 17/02* (2006.01)
   *E21B 43/08* (2006.01)
   *H04B 3/02* (2006.01)

(58) Field of Classification Search
   USPC ........................................................ 307/104
   See application file for complete search history.

(56) References Cited

U.S. PATENT DOCUMENTS

| | | | |
|---|---|---|---|
| 7,775,275 B2 | 8/2010 | Patel | |
| 8,102,276 B2 | 1/2012 | Sugiura | |
| 8,469,084 B2 | 6/2013 | Clark et al. | |
| 8,567,524 B2 | 10/2013 | Schimanski et al. | |
| 8,783,355 B2* | 7/2014 | Lovell | G01F 1/68 166/302 |
| 9,007,233 B2 | 4/2015 | Sugiura et al. | |
| 9,500,074 B2 | 11/2016 | Tips | |
| 10,018,033 B2* | 7/2018 | Leeflang | E21B 17/206 |
| 10,036,234 B2* | 7/2018 | Sponchia | E21B 17/028 |
| 2003/0034177 A1 | 2/2003 | Chitwood et al. | |
| 2007/0181312 A1 | 8/2007 | Kritzler et al. | |
| 2007/0227727 A1* | 10/2007 | Patel | E21B 17/028 166/250.01 |
| 2013/0319685 A1 | 12/2013 | Pike | |

OTHER PUBLICATIONS

Van Den Steen, "Conductive, Inductive and Capacitive Subsea Connectors—Horses and Courses", Subsea Control & Data Acquisition, vol. 22, Society for Underwater Technology, 1990, pp. 47-65.
Van Den Steen, "New Developments in Inductive and Capacitive Underwater Electrical Connectors", Offshore Technology Conference, May 1988, pp. 497-504.
PCT Application Serial No. PCT/US2018/066762, International Search Report, dated Sep. 19, 2019, 7 pages.
PCT Application Serial No. PCT/US2018/066762, International Written Opinion, dated Sep. 19, 2019, 4 pages.

* cited by examiner

ELECTRICAL ISOLATION IN TRANSFERRING POWER AND DATA SIGNALS BETWEEN COMPLETION SYSTEMS IN A DOWNHOLE ENVIRONMENT

TECHNICAL FIELD

This disclosure generally relates to the field of earth or rock drilling (mining), and more particularly to use of electrical isolation in transferring power and data signals between completion systems in a downhole environment.

BACKGROUND

Well completion is a process of making a well ready for production of hydrocarbon. The process involves preparing a bottom of a borehole in a geological formation to required specifications and installing lower and upper completion systems in the borehole to facilitate extraction of hydrocarbon from the geological formation.

The lower completion system includes a tubular section inserted into the borehole and a sand control assembly for directing fluid from the geological formation into the tubular section while preventing passage of particulate material. The lower completion system also includes electronics such as sensors and actuators. The sensors measure various parameters, including temperature, pressure, and salinity associated with fluid that flows from the formation into the well. In turn, the actuators control flow valves to regulate the fluid flow from the geological formation into the tubular section. The sensor can be one or more sensors, an array of sensors, or a continuous sensor having portions in which sensors are provided.

The upper completion system is typically installed in the borehole after the lower completion system is installed. The installation involves inserting a tubular section associated with the upper completion (referred to as insert string) into the borehole and further inserting the same tubular section into at least a portion of the tubular section associated with the lower completion system. In this regard, fluid which is extracted from the formation flows into the tubular section associated with the lower completion systems, into the tubular section associated with the upper completion, and to the surface of the geological formation.

The sensors and actuators in the lower completion system need power to operate. This power is typically provided from the surface via an umbilical that is attached to the tubular section of the upper completion system. But because the well includes separate tubular sections installed at different times, the power needs to be transferred from the upper completion system to the lower completion system.

BRIEF DESCRIPTION OF THE DRAWINGS

Embodiments of the disclosure may be better understood by referencing the accompanying drawings.

The drawings are for purpose of illustrating example embodiments, but it is understood that the inventions are not limited to the arrangements and instrumentalities shown in the drawings.

DESCRIPTION OF EMBODIMENTS

The description that follows includes example systems, methods, techniques, and program flows that embody embodiments of the disclosure. However, it is understood that this disclosure may be practiced without these specific details. For instance, this disclosure refers to electrical isolation in well completion systems in illustrative examples. Embodiments of this disclosure can be applied in context other than well completion. In other instances, well-known instruction instances, protocols, structures and techniques are not shown in detail to not obfuscate the description.

Overview

An upper completion system and lower completion system facilitate production of hydrocarbons in a well system. The upper completion receives power from the surface of a geological formation via an umbilical to power electronics in the lower completion system such as sensors and/or actuators. The umbilical is connected to a coupler for transferring the power from the upper completion system to the lower completion system. The coupler has two sides. One side is associated with the upper completion system and one side is associated with the lower completion system. The side of the coupler on the upper completion converts the power from the umbilical to a field which is coupled by the side of the coupler on the lower completion system. The field takes various forms, including an electric field and/or magnetic field. The field produces a voltage and/or current on the lower completion system, thus effecting the power transfer from the upper completion system to the lower completion system.

The power from the umbilical powers electronics on the lower completion system. The side of the inductive coupler on the lower completion system is electrically connected to the electronics via a conductor such as a wire and electrical grounds associated with each side of the coupler and the electronics are at different voltage potentials. As a result, unwanted current may flow between the coupler and the electronics through the electrical grounds, forming ground loops. This current flow corrodes metal in the lower completion system and produces noise and voltage spikes at the electronics.

Embodiments disclosed herein are directed to providing electrical isolation between the coupler and the electronics in the lower completion system. The electrical isolation breaks the ground loops thereby reducing the corrosion of metal in the lower completion and suppressing voltage spikes and electrical noise at the electronics.

The electrical isolation is a circuit associated with the lower completion with one side electrically connected to the side of coupler on the lower completion and another side electrically connected to the electronics. Both sides of the electrical isolation are not coupled to ground, e.g., electrically floating. Alternatively, both sides of the electrical isolation are coupled to respective grounds which in one or more examples may be the same ground. The electrical connection takes the form of a conductor such as a wire. The electrical isolation transfers the power (e.g., voltage and current) from the coupler to the electronics via a field such as a magnetic field and/or an electric field in an isolation barrier. The isolation barrier is an electrical separation between the side of the inductive coupler associated with the lower completion system and the electronics that prevents flow of current between the coupler and the electronics thereby breaking the ground loop. The electrical separation includes an air gap, fluid gap, and/or an insulative material to further enhance the electrical isolation. In one or more examples, data signals are also transferred between the upper completion system and the lower completion system. The data signals may indicate that the electronics is to make a measurement in a borehole, adjust a flow control valve to control flow of hydrocarbons extracted from the geological formation, or indicate results of a measurement. The electrical isolation is also arranged to transfer the data signals between the coupler and the electronics via the field.

The description that follows includes example systems, apparatuses, and methods that embody aspects of the disclosure. However, it is understood that this disclosure may be practiced without these specific details. In other instances, well-known instruction instances, structures and techniques have not been shown in detail in order not to obfuscate the description.

Example Illustrations

Figure 1:
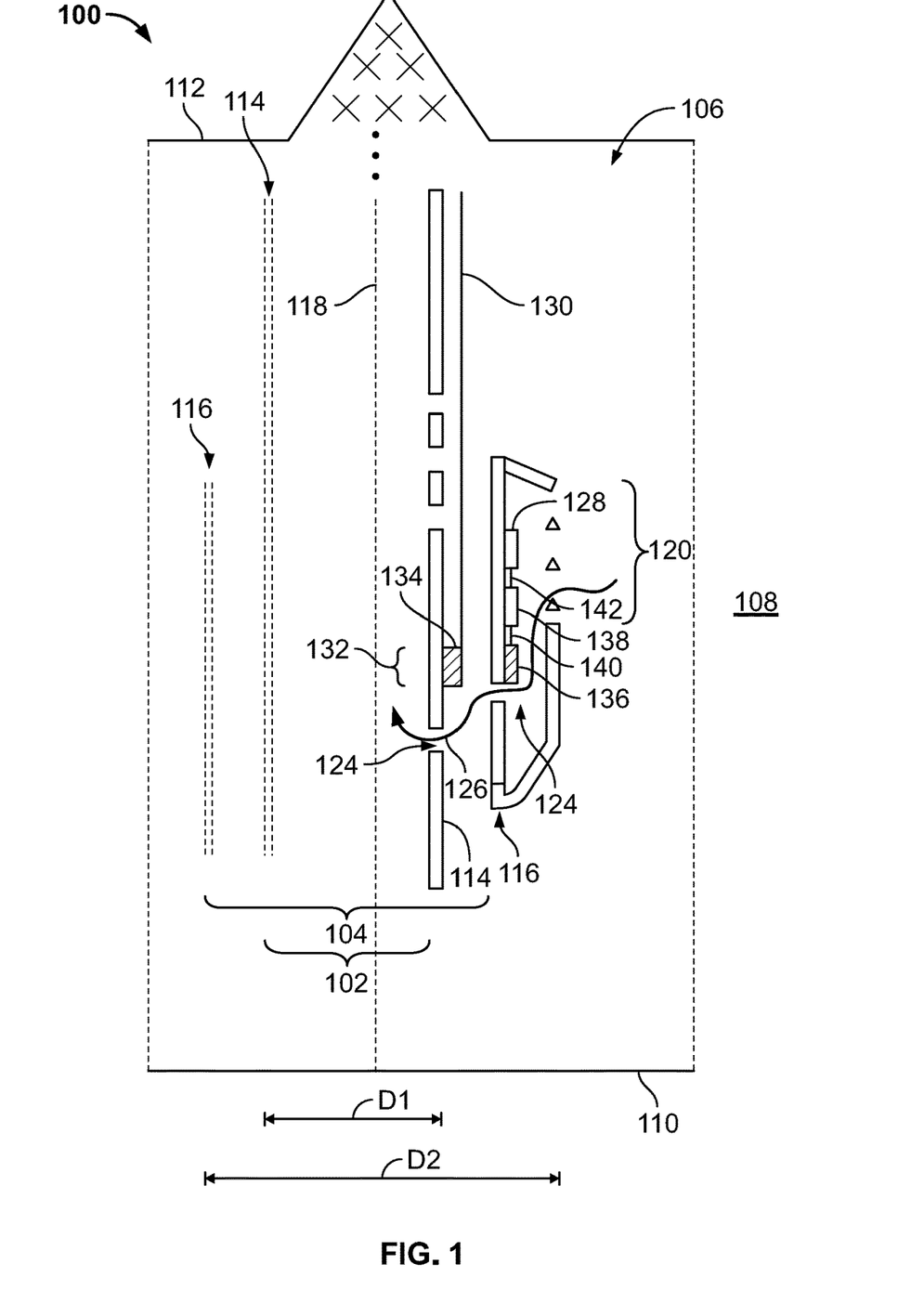
FIG. 1 shows an example cross section of an upper completion system and lower completion system in a borehole drilled into a geological formation.

FIG. 1 shows an example cross section 100 of an upper completion system 102 and lower completion system 104 installed in a borehole 106 drilled in a geological formation 108.

The upper and lower completion systems 102, 104 may take the form of respective tubular sections 114, 116 that collectively extend from a bottom 110 of the borehole 106 to the surface 112 of the geological formation 108 to facilitate extraction of fluid from the geological formation 108 to the surface 112. In undersea applications (not shown), the upper completion system 102 may extend from the surface 112 through water and to a seabed. The lower completion 104 may extend from a surface of the seabed (not shown) into the geological formation 108. The upper and lower completion systems 102, 104 may be arranged in other manners as well.

The tubular sections 114, 116 may be formed as hollow steel piping or piping of some other material. For simplicity, the cross-sectional view 100 shows one side of the tubular section 114 of the upper completion system 102 and one side of the tubular section 116 of the lower completion system 104. The other side of the respective tubular sections 114, 116 (shown as dotted lines) may look similar or different to the tubular sections shown, but in any case, positioned opposite with respect to a center line 118 (also shown as a dotted line) of the tubular sections 114, 116.

Further, a portion of the tubular section 116 associated with the lower completion system 104 may have a diameter D2 which is larger than the diameter D1 of the tubular section 114 associated with the upper completion system 104. In this regard, the tubular section 116 of the lower completion system 104 may be installed in the borehole 106 after being drilled. The installation may include one or more of steps of casing the borehole 106 with the tubular section 116, cementing an annulus between the tubular section 116 and the borehole 106, perforating the casing to allow fluid communication between the tubular section 116 and fluid reservoir in the formation, and gravel packing to prevent sand in the fluid reservoir from entering the casing. Then, the tubular section 114 of the upper completion system 102 may be installed by inserting the tubular section 114 into the borehole 106 and into at least a portion of the tubular section 116 of the lower completion system 104 to provide fluid communication from the bottom 110 of the borehole 106, through the tubular section 116, tubular section 114, and to the surface 112. The installation may also include one or more of casing the borehole 106 with the tubular section 114 and cementing an annulus between the borehole 106 and the tubular section 114.

The portion of the tubular section 116 associated with the lower completion system 104 could have a smaller diameter than the tubular section 114 associated with the upper completion system 104 in one or more other examples. The tubular section 114 of the upper completion system 102 may be installed by overlapping at least a portion of the tubular section 116 of the lower completion system 104 downhole to provide the fluid communication.

The lower completion system 104 may include a sand control assembly 120. The sand control assembly 120 may take the form of a sand screen or slotted liner. The sand control assembly 120 may filter particulates from the fluid that flows from the geological formation 108 but before the fluid reaches the tubular section 116 of the lower completion system 104 via the gravel pack. Then, the fluid may flow through a perforation 124 in the tubular section 116 of the lower completion system 104 and into a perforation 124 in the tubular section 114 of the upper completion system 102. The tubular section 114 of the upper completion 102 carries the fluid to the surface 112. This fluid flow is illustrated by arrow 126.

The lower completion system 104 may include electronics. For example, the electronics may take the form of a sensor 128 to measure properties of the fluid such temperature, pressure, salinity, etc. In order to power the electronics, an umbilical 130 mounted on an outside of the tubular section 114 of the upper completion system 102 may carry power from the surface 112, to the upper completion 102. The umbilical 130 may be coupled to a power source for providing the power and/or a computer system with hardware and/or software for operating various components associated with the upper completion system 102 and lower completion system 104 described herein. The computer and/or power source may be located downhole and/or at the surface 112 of the geological formation 108.

As the respective tubular sections 114, 116 associated with the upper completion system 102 and lower completion system 104 are installed at different times, the upper completion system 102 and lower completion system 104 may further have a coupler 132 to transfer the power from the upper completion system 102 to the lower completion system 104.

The coupler 132 may consist of two sides 134, 136. One side 134 of the coupler 132 may be located on the outer surface of the tubular structure 114 (referred to as a primary side or input) and another side 136 of the coupler 132 may be located on an outer surface of the tubular section 116 of the lower completion system 104 (referred to a secondary side or output).

The coupler 132 may take the form of a transformer. The primary and secondary side may include a conductor such as a wire made of copper or aluminum wound into coils having one or more turns. The umbilical 130 may be connected to the primary side whose voltage and/or current causes the coil to induce an electromagnetic field. In one or more examples, the coil may be wound around a laminated magnetic core of a ferromagnetic material like iron or ferrite or a laminated non-magnetic core, which increases the electromagnetic field which is induced. The primary side and secondary side may be aligned with each other. Alignment may result in the induced electromagnetic field passing through at least a portion of the coil associated with the secondary side across a gap which may take the form of air, mud, rock, or some other type of material with insulative or dielectric properties which separates the upper completion system 102 and lower completion system 104. In turn, the electromagnetic field induces a voltage in the coil associated with the secondary side. In this regard, the coupler 132 transfers power from the umbilical 130 to the upper completion system 102 and then to the lower completion system 104.

The coupler 132 may have a coupling to ground such as found in a wye-delta transformer, balun transformer, or zigzag grounding wire and an electrical connection between the primary and secondary side to improve coupling. Further, the primary and secondary side may be oriented in different ways. For example, the primary and secondary side may be oriented so that the axial direction of each is in a same direction, e.g., both may be oriented vertically or horizontally in the borehole 106. In another example, the primary and secondary side may be oriented so that the axial direction of each is in different directions, e.g., the primary side may be oriented vertically and the secondary side may be oriented horizontally. The primary side and secondary side may also be oriented so that the axial direction of each is at an angle ranging between a horizontal and vertical position.

Alternatively, the coupler 132 may take the form of a capacitive coupler. The two sides 134, 136 of the capacitive coupler may be electrodes separated by a gap. Application of a time varying voltage on one side 134 of the coupler 132 induces an electric field in the gap and produces a time varying current on the side 136. In this regard, power is transferred between the electrodes by means of displacement of current induced by the electric field between the electrodes. The capacitive coupler may also have a ground coupling and/or electrical connection between the two sides 134, 136 of the capacitive coupler to improve electrical connection.

The coupler 132 may take other forms as well. The coupler may be electrode based such that the two sides 134, 136 contact each other to provide the coupling such as a wet connect.

In one or more examples, one or both of the tubular structures 114, 116 may have multiple instances of sides of the couplers 132 along the tubular structures 114, 116 that are serially coupled together via a conductor such as a wire. The multiple instances reduce a need for a precise positioning of the tubular structures 114, 116 while increasing chances that at least one side of the coupler 134 is aligned with another side of the coupler 136 when the tubular structure 114 of the upper completion system 102 is inserted into the tubular structure 116 of the lower completion system 104 or vice versa.

In one or more examples, the lower completion system 104 has electrical isolation 138 between the coupler 132 and the electronics such as the sensor 128. The electrical isolation 138 is arranged such that side 136 has an output which is electrically connected to an input of one side of the electrical isolation 138, e.g., via conductor 140 such as a wire, and the sensor 128 has an input which is electrically connected an output of another side of the electrical isolation 138, via conductor 142 but the sides of the electrical isolation 138 are electrically separated via an isolation barrier. Both sides of the electrical isolation 138 are not coupled to ground, e.g., electrically floating. Alternatively, both sides of the electrical isolation 138 are coupled to respective grounds which in one or more examples are the same ground. The ground may be a reference point in an electrical circuit from which voltages are measured, a common return path for electric current, or a direct physical connection to the earth.

The isolation barrier forms an air gap or other gap with an insulative material between the sides of the electrical isolation 138. A field may be formed within the isolation barrier of the electrical isolation 138. The field may take the form of an electric and/or magnetic field across the isolation barrier that facilitates transfer of power between the coupler 132 and the sensor 128 even though the sides of the electrical isolation 138 are electrically separated. The isolation barrier may prevent direct current flow between side 136 of the coupler 132 associated with the lower completion system 116 and the sensor 128. In this regard, the isolation barrier may also break ground loops which would otherwise flow between the side 136 of the coupler 132 and the sensor 128 because grounds associated with the lower completion and upper completion systems 104, 102 are at different potentials. The electrical isolation 138 reduces corrosion of metal associated with the lower completion system 104. The electronic isolation 138 also reduces electrical noise and suppresses voltage spikes to the sensor 128.

FIG. 2A-H illustrates various forms that the electrical isolation 138 may take in the lower completion system 116.

Figure 2A:
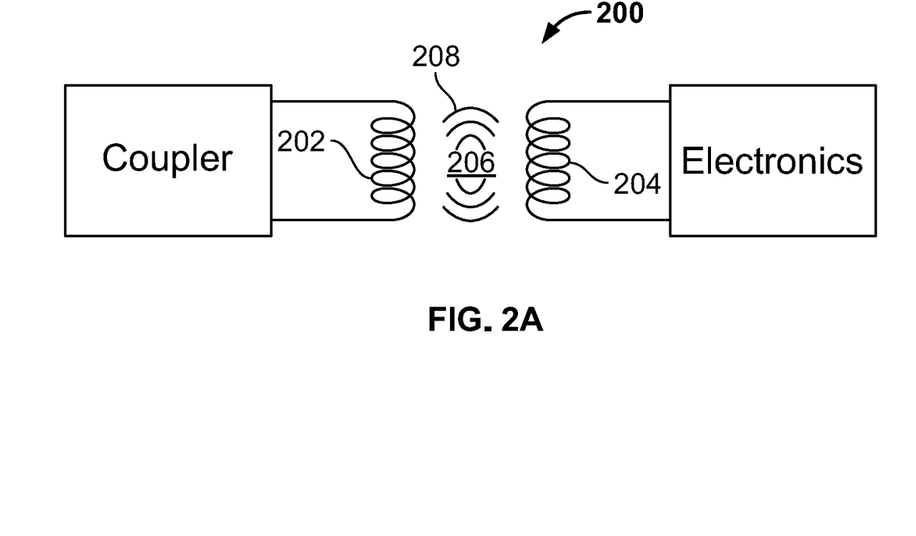
FIG. 2A-H illustrates various forms of electrical isolation.

In FIG. 2A, the electrical isolation may take the form of a transformer 200 with a primary side 202 and secondary side 204 which are electrically separated by the isolation barrier 206. The primary side 202 may be electrically connected to the side of the coupler associated with the lower completion system and the secondary side may be electrically connected to the sensor. The primary side 202 may include a conductive coil made of copper or aluminum wire wound into coils of one or more turns which convert a current and/or voltage received from the coupler to an electromagnetic field 208 in the isolation barrier 206. The isolation barrier is an electrical separation which prevents flow of current between the primary side 202 and secondary side 204 and can include an air gap or an insulative material to further enhance the electrical isolation. The electromagnetic field induces a voltage on the secondary side 204 which is then provided to the sensor 128 in FIG. 1. The secondary side 204 may take the form of a conductive coil. Each of the coils of the primary 202 and secondary side 204 can be oriented in different ways, including vertically, horizontally, and combinations thereof.

Figure 2B:
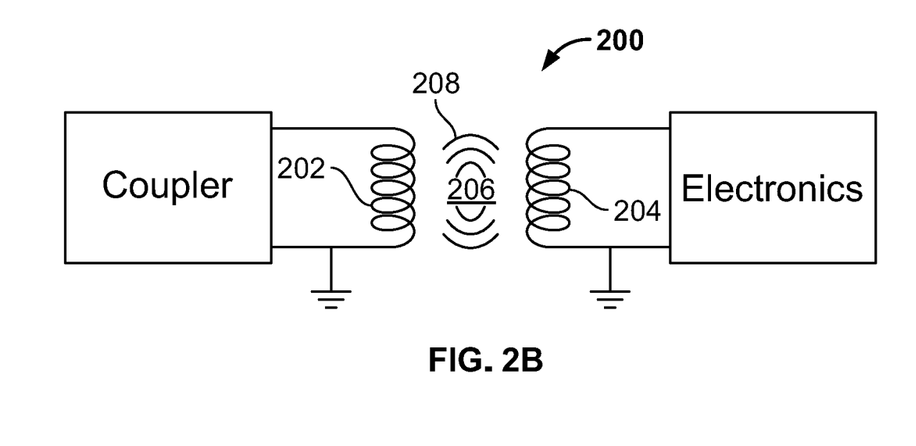

Because power line/transient voltage noise can be coupled thru capacitance and resistive paths of the coils, the transformer 200 may have additional features to improve electrical isolation. DC signals are blocked by the transformer 200 as well as interference caused by ground loops by avoiding use of a coupling to ground such as found in a wye-delta transformer, balun transformer, or zigzag grounding wire. An electrostatic shield is also used to reduce any capacitance between the windings. The transformer 200 may not have any electrical shorts between the primary side 202 and secondary side 204, e.g., the sides do not contact each other. In one or more examples, the coil may be wound around a non-magnetic core, a laminated core, or magnetic core of a solid ferromagnetic material like iron or ferrite to suppress voltage spikes. The primary side 202 and secondary side 204 are not coupled to ground, e.g., both sides are electrically floating. Alternatively, the primary side 202 and secondary side 204 are coupled to respective grounds which in one or more examples may be the same ground. This embodiment is shown in FIG. 2B. In either case, the transformer 200 might not be a balun where only one side is coupled to ground.

Figure 2C:
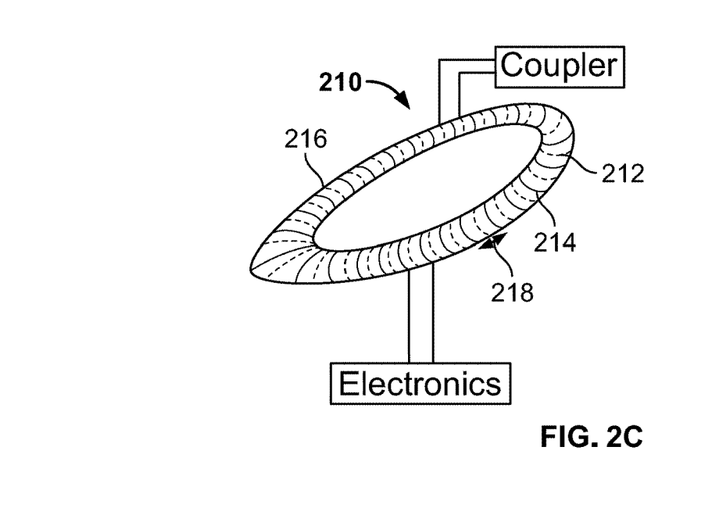
Figure 2D:
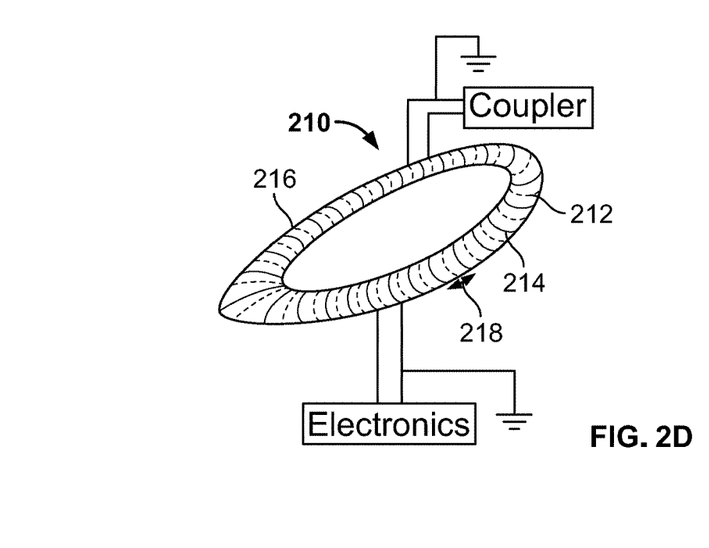

In FIG. 2C, the electrical isolation may take the form of a toroid 210. The toroid 210 may have separate windings 212 and 214 made of a conductor such as copper or aluminum wire wound around a core 216. The separate windings 212 and 214 are shown as dotted lines and solid lines, respectively. The windings 212 may be electrically connected to the side of the coupler associated with the lower completion system and the windings 214 may be electrically connected to the sensor. The winding 212 and winding 214 are not coupled to ground, e.g., both windings are electrically floating. Alternatively, the winding 212 and winding 214 are coupled to respective grounds which in one or more examples may be the same ground. This embodiment is shown in FIG. 2D. In either case, the toroid 210 might not be a balun where only one side is coupled to ground.

The core 216 may take the form of a non-magnetic core, a laminated core, or magnetic core of a solid ferromagnetic material like iron or ferrite. Coils of the winding 212 and winding 214 are electrically separated by an isolation barrier 218. Power, e.g., voltage and/or current, from the side of the coupler associated with the lower completion is applied to the winding 212. The winding 212 may induce an electromagnetic field in the isolation barrier 218. The electromagnetic field may induce a voltage in the winding 214 which is provided to the sensor. The toroid 210 may not have any electrical shorts between the windings 212, 214 or coupling to ground e.g., the windings do not contact each other. The electrical isolation in the form of the toroid 210 also achieves DC block, noise and/or interference isolation in a manner similar to that of the transformer. But due to symmetry associated with the toroid 210, little magnetic flux escapes from the core 216 resulting in less electromagnetic interference in adjacent circuits such as the sensor.

Figure 2E:
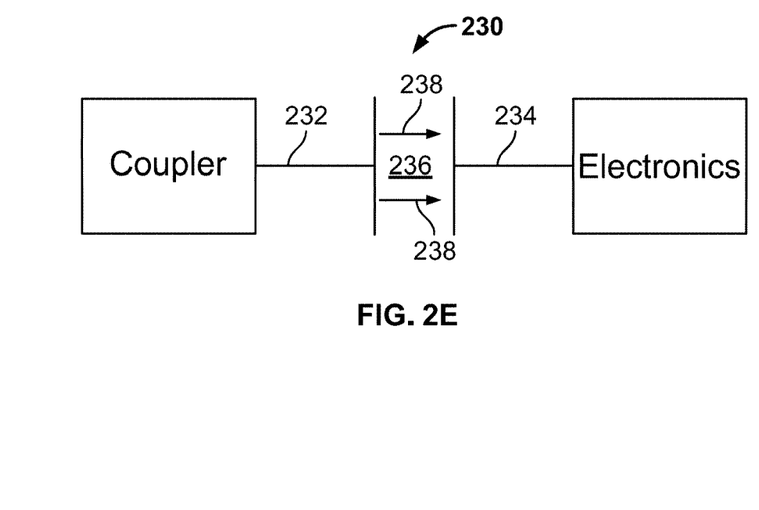
Figure 2F:
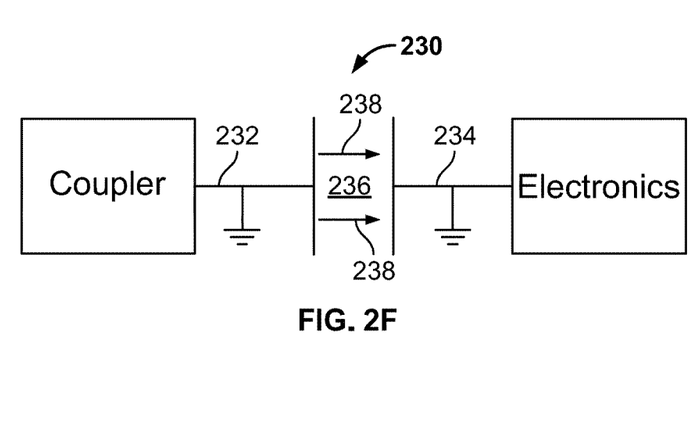

In FIG. 2E, the electrical isolation may be based on capacitive coupling (also referred to as capacitive isolation). Capacitive coupling is a transfer of energy by means of displacement of current induced by an electric field. A capacitive coupler 230 may include two electrodes 232, 234 separated by an isolation barrier 236 which physically separates the two electrodes 232, 234. The electrode 232 and electrode 234 are not coupled to ground, e.g., both electrodes are electrically floating. Alternatively, the electrode 232 and electrode 234 are coupled to respective grounds which in one or more examples may be the same ground. This embodiment is shown in FIG. 2F. The electrode 232 may be electrically connected to the side of the coupler associated with the lower completion system and the electrode 234 may be electrically connected to the sensor. The capacitive coupler 230 may not have any electrical shorts between the electrodes 232, 234 or coupling to ground, e.g., the electrodes do not contact each other. Power from the coupler is applied to the electrode 232 of the capacitive coupler 230. The power received may take the form of a voltage. The voltage is applied to the electrodes 232 forms an electric field 238 in the isolation barrier 236. The electric field results in an alternating current being generated at the electrodes 234 while blocking DC. This alternating current is then provided to the sensor.

Figure 2G:
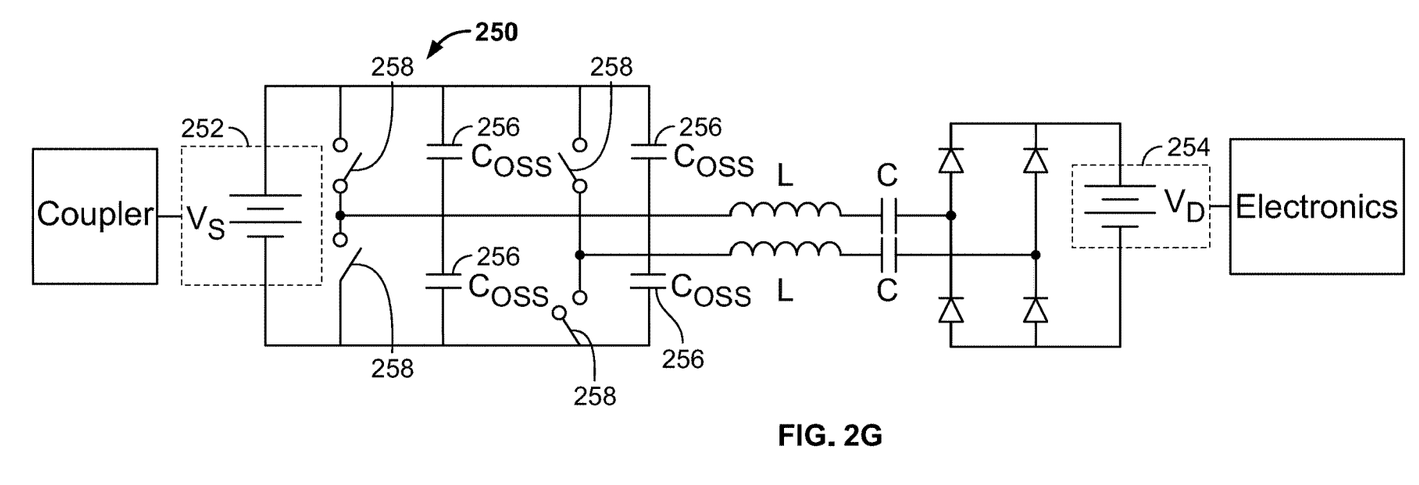
Figure 2H:
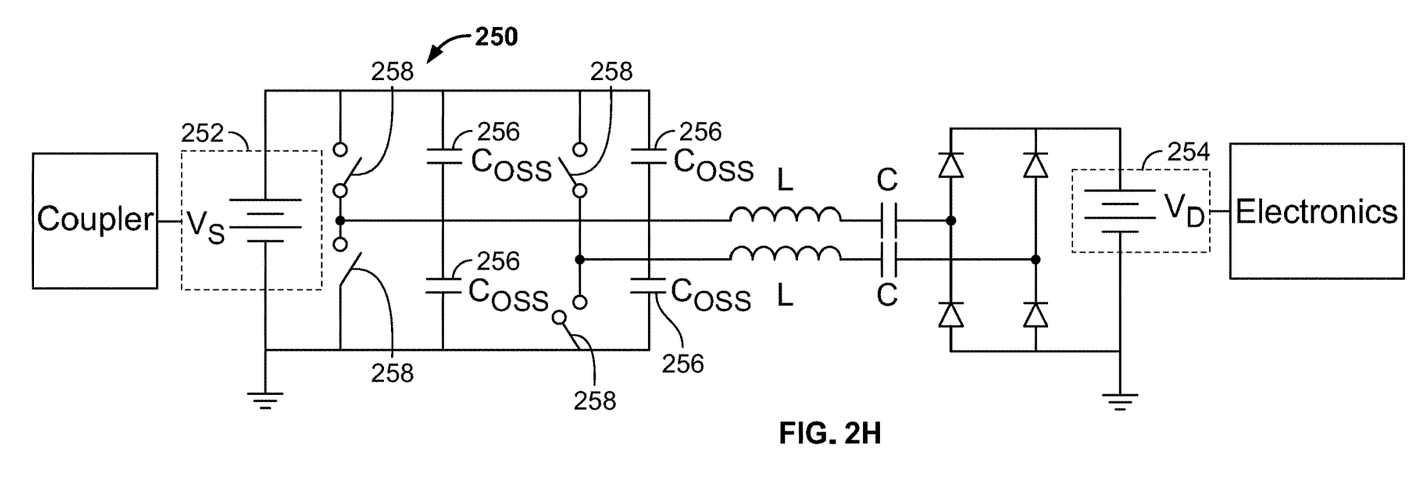

In FIG. 2G, electrical isolation may be based on an isolation circuit 250 with capacitive coupling. The isolation circuit 250 may have a terminal 252 and a terminal 254. The terminal 252 and terminal 254 are not coupled to ground, e.g., electrically floating. Alternatively, the terminal 252 and terminal 254 are coupled to respective grounds which in one or more examples may be the same ground. This embodiment is shown in FIG. 2H. The terminal 252 may be electrically connected to the side of the coupler associated with the lower completion system and the terminal 254 may be electrically connected to the electronics such as the sensor. $V_s$ is a source voltage applied to the terminal 252 and $V_d$ is a load voltage received at the terminal 254. In this regard, the source voltage may be a voltage at the side of the coupler associated with the lower completion system and load voltage may be a voltage provided to the sensor. Additionally, the isolation circuit may have capacitive coupling C. In operation, an H bridge taking the form of capacitance $C_{oss}$ 256 and switches 258 is charged and discharged based on the switching at a frequency such as a resonance frequency of the isolation circuit 250 so power at $V_s$ is efficiently transferred to the load $V_d$ while providing electrical isolation via the capacitive coupling C. The H bridge driver converts $V_s$ into an AC voltage to enable current flow through the capacitors C. Inductors L are placed in series with the coupling capacitance to enable soft-switching. A diode rectifier converts the AC voltage back to DC.

The electrical isolation may take other forms as well. For example, the electrical isolation may take the form of an electroacoustic transducer (piezoelectric) that provides acoustic coupling. A voltage and/or current is converted to sound, the sound is converted back to the voltage and/or current by the electroacoustic transducer, and the voltage and/or current is provided to the sensor. In common, the electrical isolation may provide electrical separation between the coupler associated with the lower completion system and the sensor. Further, in one or more examples, the electrical isolation 138 may take a form different from the coupling 132. For example, the coupling 132 may take the form of the transformer and the electrical isolation 138 may take the form of the capacitive coupling. In this regard, the coupling 132 may be inductive with an inductive reactance while the electrical isolation 138 is capacitive with a capacitive reactance. As another example, the coupling 132 may take the form of the capacitive coupling and the electrical isolation 138 may take the form of the transformer or toroid. In this regard, the coupling 132 may be capacitive with a capacitive reactance while the electrical isolation 138 is inductive with an inductive reactance. Other combinations are also possible.

The cross section shown in FIG. 1 is exemplary in nature. The lower and upper completion in a borehole drilled into a geological formation may take other forms. Electrical isolation may be arranged in these other forms to isolate the coupler from the electronics.

Figure 3:
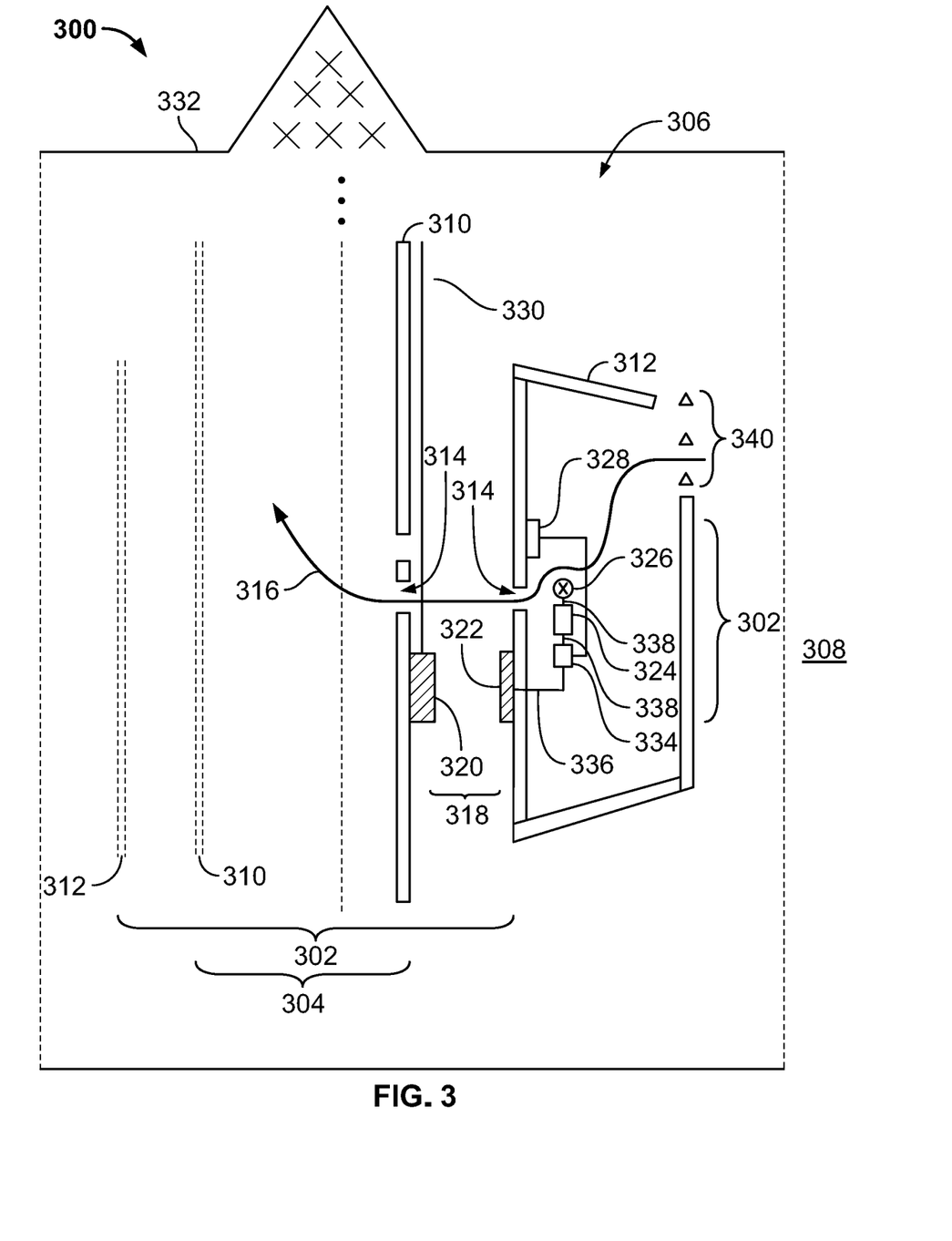
FIG. 3 shows an example cross section of a lower completion system and upper completion system in a borehole drilled into a geological formation.

FIG. 3 shows another example cross section 300 of a lower completion system 302 and upper completion system 304 in a borehole 306 drilled into a geological formation 308. The cross section 300 includes a tubular section 310 of the upper completion system 304 and tubular section 312 of the lower completion system 302. Fluid flows from the geological formation 308 though sand control assembly 340 and into the tubular section 312 of the lower completion system 304, through perforations 314, and into the tubular section 310 of the upper completion system 304. The fluid flow is shown via arrow 316.

The cross section 300 shows a coupler 318. One side 320 of the coupler 318 may be on an outside of the tubular section 310 of the upper completion system 302 that receives power from an umbilical 330 while another side 322 of the coupler 318 may be on an inside of the tubular section 312 of the lower completion system 304. In this arrangement, the lower completion system 304 may include electronics such as an actuator 324. The actuator 324 may control a valve 326 which controls fluid flow through the perforation 314. The valve 326 may be adjustable to control fluid flow at various rates through the perforation 314 or binary to control whether fluid flows or does not flow through the perforation 314. Additionally, the cross section 300 may have a sensor 328. The sensor 328 may operate in a manner similar to the sensor described in FIG. 1.

An output of the side 320 of the coupler 318 may be electrically connected, e.g., via a conductor such as wire 336, to an input of one side of the electrical isolation 334. In turn, an output of another side of the electrical isolation 334 may be electrically connected, e.g., via a conductor such as wire 338, to an input of one or more of the sensor 328 and actuator 324. The electrical isolation 334 may have an isolation barrier. The isolation barrier electrically separates the sides of the electrical isolation. Power (e.g., voltage and/or current) from the coupler 318 to the sensor 328 and/or actuator 324 is transferred in the isolation barrier via a field such as a magnetic field and/or an electric field. Further, the isolation barrier prevents direct current flow between the side 322 of the coupler 318 associated with the lower completion system 312 and the sensor 328 and/or actuator 324. The electrical isolation 334 also reduces corrosion of metal associated with the lower completion system 312 due to the grounds associated with the coupler 318, sensor 328, and actuator 324 being at different potentials by breaking ground loops. The electrical isolation 334 also suppresses electrical noise and voltage spikes to the sensor 328 and actuator 324. Examples of the forms that the electrical isolation 334 are shown in FIGS. 2A-H.

Other variations of the upper and lower completion systems are also possible. For example, a side of the inductive coupler may be on an inside of the tubular section associated with the upper completion while a side of the inductive coupler of the inductive coupler may be on an inside or outside of the tubular section associated with the lower completion. Additionally, or alternatively, the umbilical may run along an inside of the tubular section of the upper completion. Still additionally or alternatively, the umbilical may power electronics in addition to or instead of the sensor and/or actuator such as storage devices such as batteries and/or capacitors associated with the lower completion and which are isolated from the coupler in accordance with the disclosed embodiments.

In one or more examples, one or both of the tubular structures may have multiple instances of the sides of couplers. The sides associated with the upper completion system may be positioned along the tubular and electrically connected via a conductor such as a wire. The sides associated with the lower completion system may be positioned along the tubular and electrically connected via a conductor such as a wire. The sides of the coupler associated with the lower completion may be further coupled to the electrical isolation and/or electronics. Multiple instances of the sides of the couplers on each of the upper completion system and lower completion system reduce a need for a precise positioning of the tubular structures when the tubular structure of the upper completion system is inserted into the tubular structure of the lower completion system (or vice versa) while increasing chances that at least one side of the coupler is aligned with another side of the coupler.

In one or more examples, the umbilical may carry data signals. The data signals may be generated by the computer system coupled to the umbilical and indicate a state associated with the electronics, such as the actuator is to open or close a flow valve and/or the sensor is to sense a temperature. A coupler transfers data signals from the upper completion system to the lower completion system. The coupler which transfers data signals from the upper completion system to the lower completion system may be physically the same or different from the coupler which transfers power signals from the upper completion system to the lower completion system. The data signals may be provided to the electronics via an electrical isolation which may take the form of FIGS. 2A-H. Additionally or alternatively, the electrical isolation associated with the data signals may take the form of an optical coupler. The optical couplers may convert voltage and/or current associated with the data signals to light and back to the voltage and/or current (i.e., data signal) which is provided to the sensor. Still additionally or alternatively, the electrical isolation associated with the data signals may include a Hall sensor, and/or Giant magnetoresistance (GMR) sensor. One side of electrical isolation electrically connected to the coupler may be a coil which produces a magnetic field and another side of the electrical isolation may be a Hall sensor, and/or Giant Magnetoresistance (GMR) sensor. The Hall sensor and GMR sensor may varying an output current and/or voltage indicative of the data signal provided to the electronics in response to the magnetic field. In one or more examples, the electrical isolation which provides the data signals to the electronics may additionally or alternatively provide power signals to the electronics.

If the power and data signals are both carried by the umbilical, the power and data signals may be distinguished by frequency among other properties. The power and data signals may be transmitted at frequencies and/or at times which do not overlap with each other. For example, frequencies between 10 Hz and 10 kHz may be associated with data signal transmission while frequencies below 10 Hz are associated with power transmission. Conventional digital modulation schemes, for example, including QAM, DSL, ADSL, TDMA, FDMA, and the like, may also be utilized.

Figure 4:
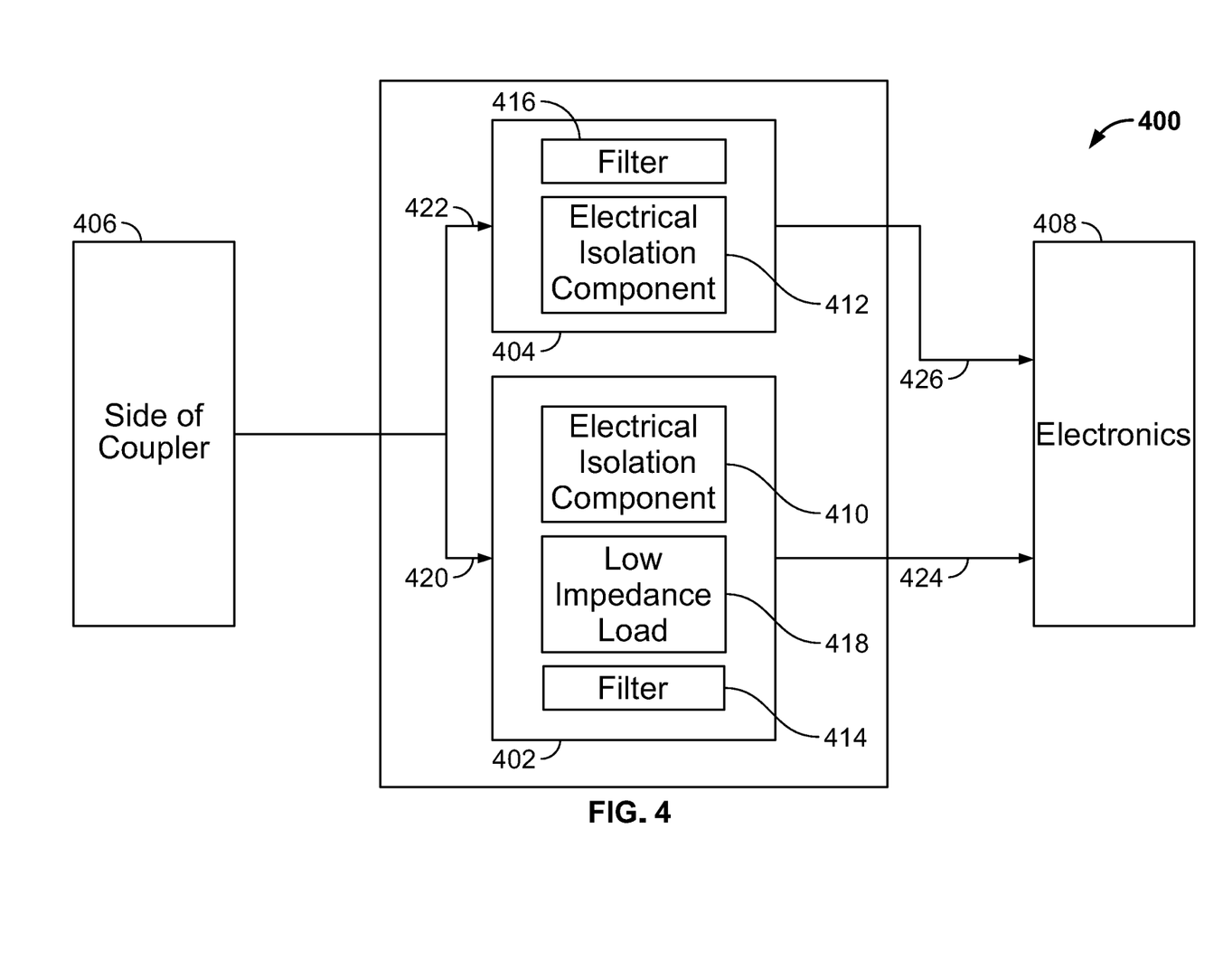
FIG. 4 is an example of an electronic isolation associated with power and data signals.

FIG. 4 is an example of electrical isolation 400 where different frequencies are used to transmit power and data signals. The electrical isolation 400 may be electrically connected to a side of coupler associated with the lower completion system, which in turn is coupled a side of the coupler associated with the upper completion system, and which in turn is coupled to the umbilical carrying both the power and data signals.

The electrical isolation 400 may have a power isolation module 402 and data isolation module 404. The power isolation module 402 and data isolation module 404 may be packaged together or separately. The power isolation module 402 may be arranged to transfer power from the side 406 of the coupler associated with the lower completion system to the electronics 408 while the data isolation module 404 may be arranged to transfer data signals from the side 406 of the coupler associated with the lower completion system to the electronics 408. Each of the modules 402, 404 may have a respective electrical isolation component 410. Design of the electrical isolation component 410, 412 may be the same in each module 402, 404 or different and take one or more forms of the electrical isolation described above, among others.

The power isolation module 402 may have a frequency selective element such as filter 414. The filter 414 will permit power at a frequency or range of frequencies to pass through the power isolation module 402 while rejecting other frequencies. Further, the power isolation module 402 may have a low impedance load 418. The low impedance load 418 allows for maximum efficiency in power transmission through the power isolation module 402. The low impedance load 418 may located as a component within the power isolation module 402 as shown or at an input or output to the power isolation module 402. The low impedance load 412 may be arranged as a resonant circuit, e.g., capacitor and/or inductor, to achieve the low impedance.

The data isolation module 404 may also have a frequency selective element such as filter 416. The filter 416 will permit frequencies associated with data signals (rather than power) to pass through the data isolation module 404 while rejecting other frequencies.

The side 406 of the coupler associated with the lower completion system may be electrically connected to an input 420, 422 of the power isolation module 402 and data isolation module 404 respectively. The power isolation module 402 may output the power to electronics 408 on the lower completion system at 424. Additionally, the data isolation module 404 may output the data signal to the electronics 408 on the lower completion system at 426. The power and data signals may be provided to the electronics on a common input and/or input dedicated for power or data signals.

As discussed above, the tubular section associated with each of the lower completion system and upper completion system may have a plurality of couplers. Some of the couplers may be associated with transferring power from the upper completion system to the lower completion system while other of the couplers may be associated with transferring data signals from the upper completion to the lower completion. The couplers associated with transferring power signals and transferring data signals may be coupled to respective electrical isolation electrically connected to the electronics or to a common electrical isolation electrically connected to the electronics.

Additionally, the examples described above discuss providing power and/or data signals received from the upper completion system to the lower completion system. The lower completion system may also be arranged to provide power and/or data signals to the upper completion system. For example, a battery on the lower completion system may be electrically connected to a first side of an electrical isolation associated with the lower completion. A second side of the electrical isolation also associated with the lower completion may be electrically connected to a first side of a coupling associated with the lower completion system. A second side of the coupler associated with the upper completion may be aligned with the first side of the coupler. In this regard, battery power is transferred from the lower completion to the upper completion. Data signals from the sensors on the lower completion system may be conveyed to the upper completion system via an electrical isolation and coupling to the upper completion system in a manner similar to that described with respect to the battery power. The electrical isolation and/or coupler for conveying signals from the lower completion system to the upper completion system may also convey the signals from the upper completion system to the lower completion system as described above. In this regard, the electrical isolation and/or coupler may be bi-directional in nature. In one or more examples, the electrical isolation and/or coupler for conveying signals from the lower completion system to the upper completion system may only convey the signals from the upper completion system to the lower completion system. In this regard, the electrical isolation and/or coupler may be unidirectional in nature. Other electrical isolation and/or coupler, also unidirectional in nature, conveys signals from the upper completion system to the lower completion system.

Further, the electrical isolation may be applied in context other than providing power signals and/or data to a lower completion system. Similar arrangements may be applied when different structures are installed separately and electronics associated with one structure are powered and/or receive data from another structure.

Figure 5:
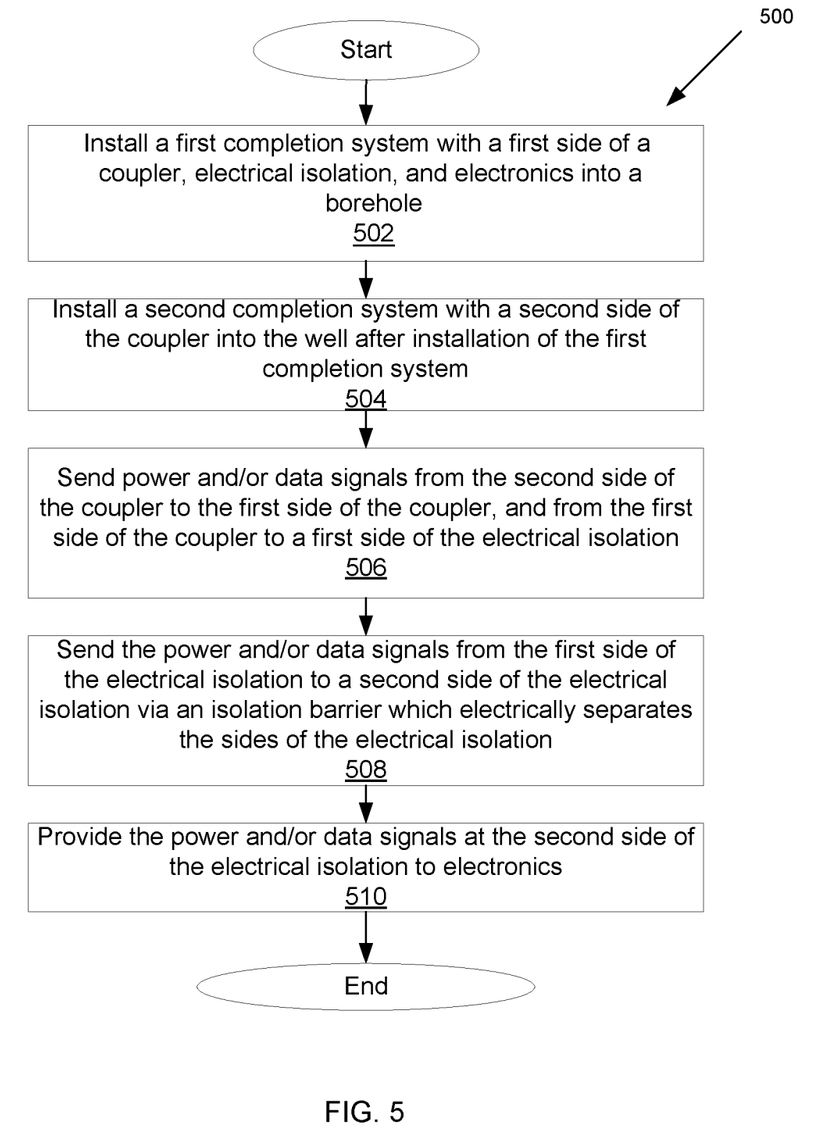
FIG. 5 is a flow chart of functions associated with completing a well arranged with electrical isolation in the lower completion system.

FIG. 5 is a flow chart 500 of functions associated with achieving electrical isolation to electronics in a lower completion system based on power and/or data received from an upper completion. One or more functions may be performed by components of the upper and/or lower completion themselves, and/or under control by the computer coupled to the umbilical.

At 502, a first completion system with a first side of a coupler, electrical isolation, and electronics is installed in a borehole. The installation process may include casing a borehole with tubular sections, cementing an annulus between the tubular section and the borehole, perforating the casing, etc. The first side of the coupler may be electrically connected to a first side of the electrical isolation via a conductor such as wires. In turn, a second side of the electrical isolation may be electrically connected to the electronics via a conductor such as wires. At 504, a second completion system with a second side of the coupler is installed into the well after installation of the first completion system. The installation process may also include casing a borehole with tubular sections and cementing an annulus between the tubular section and the borehole. The second side of the coupler is aligned to the first side of the inductive coupler. The alignment permits transfer of power and/or data signals from the first side of the coupler to the second side of the coupler and to the electronics via the electrical isolation. Various functions are then performed with respect to the upper and lower completion which in one or more examples are under control of the computer system coupled to the umbilical or some other computer system.

At 506, power and/or data signals is sent (e.g., transferred) from the second side of the coupler to the first side of the coupler, and from the first side of the coupler to the first side of the electrical isolation. The power and/or data signals is sent from an output of the first side of the coupler to an input of the first side of the electrical isolation via the electrical connection. The signal transfer may be under the control of the computer which causes the signals to be sent from the output of the first side of the coupler to the input of the first side of the electrical isolation. At 508, power and/or data signals is sent (e.g., transferred) from the first side of the electrical isolation to a second side of the electrical isolation via an isolation barrier which electrically separates the sides of the electrical isolation. Again, the signal transfer may be under the control of the computer which causes the signals to be sent (e.g., transferred) from the first side of the electrical isolation to the second side of the electrical isolation via the isolation barrier. At 510, the power and/or data signals are provided to electronics. The power and/or data signals is sent from an output of the second side of the electrical isolation to an input of the electronics via the electrical connection. In this regard, the electrical isolation facilitates transfers power from the coupler to the electronics while blocking DC current, noise, voltage spikes, etc.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 502-510 of FIG. 5 can be performed in parallel or concurrently. It will be understood that some blocks of the flowchart illustrations and/or block diagrams, and combinations of blocks in the flowchart illustrations and/or block diagrams, can be implemented by hardware, circuitry, and/or program code. The program code may be provided to a processor of a general purpose computer, special purpose computer, or other programmable machine or apparatus.

Aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently.

Aspects of the disclosure may be embodied as a system, method or program code/instructions stored in one or more machine-readable medium(s). Additionally, any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

In the context of this document, a machine readable storage medium may be any non-transitory tangible medium that can contain, or store a program for use by or in connection with an instruction execution system, apparatus, or device. A machine readable storage medium is not a machine readable signal medium. Further, program code embodied on a machine readable medium may be transmitted using any appropriate medium, including but not limited to wireless, wireline, optical fiber cable, RF, etc., or any suitable combination of the foregoing. The program code/instructions may also be stored in a machine readable medium that can direct a machine to function in a particular manner, such that the instructions stored in the machine readable medium which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for electrical isolation in a downhole environment as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Example embodiments include the following:

Embodiment 1: A method comprising: receiving power from an umbilical which carries power from a surface of a geological formation into a borehole drilled in the geological formation; transferring the power from a first side of a coupler to a second side of the coupler, wherein the first side of the coupler is associated with an upper completion system in the borehole and the second side of the coupler is associated with a lower completion in the borehole; transferring the power from the second side of the coupler to a first side of an electrical isolation via an electrical connection, wherein the electrical isolation is associated with the lower completion system; transferring the power from the first side of the electrical isolation to a second side of the electrical isolation via an isolation barrier, wherein an isolation barrier electrically separates the first side of the electrical isolation from the second side of the electrical isolation; and providing the power to electronics associated with the lower completion via an electrical connection between the second side of the electrical isolation and the electronics; wherein the first side of the electrical isolation and second side of the electrical isolation are electrically floating.

Embodiment 2: The method of Embodiment 1, wherein the umbilical further carries data signals from the surface to the first side of the coupler; and wherein the data signals are sent (i) from the first side of the coupler to the second side of the coupler, (ii) from the second side of the coupler to the first side of the electrical isolation; (iii) from the first side of the electrical isolation to the second side of the electrical isolation via the isolation barrier; and (iv) from the second side of the electrical isolation to the electronics via the electrical connection between the second side of the electrical isolation and the electronics.

Embodiment 3: The method of Embodiment 1 or 2, wherein the electrical isolation comprises a capacitive coupling and a switching circuit which switches at a resonance frequency of the electrical isolation.

Embodiment 4: The method of any one of Embodiments 1-3, wherein the power has a first frequency and the data signals has a second frequency.

Embodiment 5: The method of any one of Embodiments 1-4, wherein the coupler is inductive and the electrical isolation is capacitive or the coupler is capacitive and the electrical isolation is inductive.

Embodiment 6: The method of any one of Embodiments 1-5, wherein an output of the second side of the coupler is electrically connected to an input of the first side of the electrical isolation and an output of the second side of the electrical isolation is electrically connected to an input of the electronics.

Embodiment 7: The method of any one of Embodiments 1-6, wherein installing the upper completion system comprises inserting a tubular section associated with the second completion system into a tubular section associated with the lower completion system in the borehole.

Embodiment 8: The method of any one of Embodiments 1-7, wherein grounds associated with the electronics and the second side of the coupler are at different potentials.

Embodiment 9: The method of any one of Embodiments 1-8, wherein the isolation barrier suppresses flow of direct current between the first side of the electrical isolation and the second side of the electrical isolation.

Embodiment 10: A system comprising: a first completion system having electrical isolation, electronics, and a first side of a coupler, wherein the first side of the coupler is electrically connected to a first side of the electrical isolation and a second side of the electrical isolation is electrically connected to the electronics; wherein an isolation barrier electrically separates the first side of the electrical isolation from the second side of the electrical isolation; and a second completion system having a second side of the coupler which is aligned with the first side of the coupler and an umbilical coupled to the second side of the coupler; wherein the first side of the electrical isolation and second side of the electrical isolation are electrically floating.

Embodiment 11: The system of Embodiment 10, wherein the isolation barrier has insulative properties.

Embodiment 12: The system of Embodiment 10 or 11, wherein grounds associated with the electronics and the second side of the coupler are at different potentials.

Embodiment 13: The system of any one of Embodiments 10-12, wherein the sides of the electrical isolation are not electrically connected together.

Embodiment 14: The system of any one of Embodiments 10-13, wherein the first side of the electrical isolation is a coil and the second side of the electrical isolation is a Hall sensor or GMR sensor.

Embodiment 15: The system of any one of Embodiments 10-14, wherein the isolation barrier suppresses one or more of voltage spikes and electrical noise between the first side of the electrical isolation and the second side of the electrical isolation.

Embodiment 16: The system of any one of Embodiments 10-15, wherein the isolation barrier suppresses flow of direct current between the first side of the electrical isolation and the second side of the electrical isolation.

Embodiment 17: The system of any one of Embodiments 10-16, wherein an output of the first side of the coupler is electrically connected to an input of the first side of the electrical isolation and an output of the second side of the electrical isolation is electrically connected to an input of the electronics.

Embodiment 18: The system of any one of Embodiments 10-17, wherein power is transferred from the first side of the electrical isolation to the second side of the electrical isolation via a field in the isolation barrier.

Embodiment 19: The system of any one of Embodiments 10-18, wherein the coupler is inductive and the electrical isolation is capacitive, or the coupler is capacitive and the electrical isolation is inductive.

Embodiment 20: The system of any one of Embodiments 10-19, wherein the umbilical further carries a data signal to control operation of the electronics, wherein the data signal is transferred to the electronics via the electrical isolation.

What is claimed is:

1. A method comprising:
   receiving power from an umbilical which carries power from a surface of a geological formation into a borehole drilled in the geological formation;
   transferring the power from a first side of a coupler to a second side of the coupler, wherein the first side of the coupler is associated with an upper completion system in the borehole and the second side of the coupler is associated with a lower completion in the borehole;
   transferring the power from the second side of the coupler to a first side of an electrical isolation via an electrical connection, wherein the electrical isolation is associated with the lower completion system;
   transferring the power from the first side of the electrical isolation to a second side of the electrical isolation via an isolation barrier, wherein an isolation barrier electrically separates the first side of the electrical isolation from the second side of the electrical isolation; and
   providing the power to electronics associated with the lower completion via an electrical connection between the second side of the electrical isolation and the electronics;
   wherein the first side of the electrical isolation and second side of the electrical isolation are electrically floating.

2. The method of claim 1, wherein the umbilical further carries data signals from the surface to the first side of the coupler; and wherein the data signals are sent (i) from the first side of the coupler to the second side of the coupler, (ii) from the second side of the coupler to the first side of the electrical isolation; (iii) from the first side of the electrical isolation to the second side of the electrical isolation via the isolation barrier; and (iv) from the second side of the electrical isolation to the electronics via the electrical connection between the second side of the electrical isolation and the electronics.

3. The method of claim 2, wherein the electrical isolation comprises a capacitive coupling and a switching circuit which switches at a resonance frequency of the electrical isolation.

4. The method of claim 2, wherein the power has a first frequency and the data signals has a second frequency.

5. The method of claim 1, wherein the coupler is inductive and the electrical isolation is capacitive or the coupler is capacitive and the electrical isolation is inductive.

6. The method of claim 1, wherein an output of the second side of the coupler is electrically connected to an input of the first side of the electrical isolation and an output of the second side of the electrical isolation is electrically connected to an input of the electronics.

7. The method of claim 1, further comprising inserting a tubular section associated with the lower completion system into a tubular section associated with the upper completion system in the borehole.

8. The method of claim 1, wherein grounds associated with the electronics and the second side of the coupler are at different potentials.

9. The method of claim 8, wherein the isolation barrier suppresses flow of direct current between the first side of the electrical isolation and the second side of the electrical isolation.

10. A system comprising:
   a first completion system having electrical isolation, electronics, and a first side of a coupler, wherein the first side of the coupler is electrically connected to a first side of the electrical isolation and a second side of the electrical isolation is electrically connected to the electronics; wherein an isolation barrier electrically separates the first side of the electrical isolation from the second side of the electrical isolation; and
   a second completion system having a second side of the coupler which is aligned with the first side of the coupler and an umbilical coupled to the second side of the coupler;
   wherein the first side of the electrical isolation and second side of the electrical isolation are electrically floating.

11. The system of claim 10, wherein the isolation barrier has insulative properties.

12. The system of claim 10, wherein grounds associated with the electronics and the second side of the coupler are at different potentials.

13. The system of claim 10, wherein the sides of the electrical isolation are not electrically connected together.

14. The system of claim 10, wherein the first side of the electrical isolation is a coil and the second side of the electrical isolation is a Hall sensor or GMR sensor.

15. The system of claim 10, wherein the isolation barrier suppresses one or more of voltage spikes and electrical noise between the first side of the electrical isolation and the second side of the electrical isolation.

16. The system of claim 10, wherein the isolation barrier suppresses flow of direct current between the first side of the electrical isolation and the second side of the electrical isolation.

17. The system of claim 10, wherein an output of the first side of the coupler is electrically connected to an input of the first side of the electrical isolation and an output of the second side of the electrical isolation is electrically connected to an input of the electronics.

18. The system of claim 10, wherein power is transferred from the first side of the electrical isolation to the second side of the electrical isolation via a field in the isolation barrier.

19. The system of claim 18, wherein the coupler is inductive and the electrical isolation is capacitive or the coupler is capacitive and the electrical isolation is inductive.

20. The system of claim 10, wherein the umbilical further carries a data signal to control operation of the electronics, wherein the data signal is transferred to the electronics via the electrical isolation.

* * * * *